United States Patent [19]

Tezuka et al.

[11] Patent Number: 5,206,850
[45] Date of Patent: Apr. 27, 1993

[54] OPTICALLY WRITABLE RECORD OF DIGITAL INFORMATION AND RECORDING APPARATUS THEREFOR

[75] Inventors: Masaru Tezuka; Satoru Tobita; Koji Ishiwata, all of Kanagawa, Japan

[73] Assignee: Sony Corporation, Tokyo, Japan

[21] Appl. No.: 469,042

[22] Filed: Jan. 23, 1990

[30] Foreign Application Priority Data

Jan. 25, 1989 [JP] Japan .................................. 1-15557

[51] Int. Cl.⁵ ............................................. G11D 5/09
[52] U.S. Cl. ................................... 369/48; 369/100; 369/275.3
[58] Field of Search ..................... 369/100, 32, 48, 58, 369/59, 111, 47, 275–279

[56] References Cited

U.S. PATENT DOCUMENTS

4,789,979  12/1988  Hiraoka et al. ...................... 369/275
4,996,678  2/1991  Maeda ................................. 369/32

FOREIGN PATENT DOCUMENTS

0251666    1/1988  European Pat. Off. .
0275972    7/1988  European Pat. Off. .
60-256925  12/1985  Japan .

*Primary Examiner*—Jeffery A. Brier
*Assistant Examiner*—Robert Chevalier
*Attorney, Agent, or Firm*—William S. Frommer; Alvin Sinderbrand

[57] ABSTRACT

An optically writable record of digital information is provided on an optically writable record disk having a reflection factor substantially higher than seventy percent, and is composed of first digital information including a plurality of program data and respective address data indicative of the individual addresses of the respective program data and being recorded with the latter sequentially along a first track in a first annular recording area of the record disk, and second digital information including table-of-contents data, identifying the plurality of program data, respectively, and being recorded sequentially along a second track which is in a second annular recording area of the record disk and which has a concluding end contiguous to a starting end of the first track so that, upon playback of the digital information record, the table-of-contents data and the plurality of program data and respective address data can be reproduced successively without interruption by a standardized compact disk player.

13 Claims, 4 Drawing Sheets

OPTICALLY WRITABLE RECORD OF DIGITAL INFORMATION AND RECORDING APPARATUS THEREFOR

BACKGROUND OF THE INVENTION

1. Field of the Invention

The present invention relates to an optically writable record of digital information, and more particularly is directed to a writable record disk of the type in which program data together with respective address data are recorded along a spiral track in an annular recording area.

2. Description of the Prior Art

In a so-called compact disk (CD) having digitized audio signals recorded as a plurality of sectional program data on a rotatable disk-like recording medium so as to be optically readable, the recording format is standardized and the plurality of sectional program data are recorded together with address data along a spiral track in a main annular recording area, while table-of-contents data (hereinafter referred to as TOC data) identifying the sectional program data in the main recording area are recorded along a spiral track in another annular recording area, termed a lead-in area, and which is located radially inside the main recording area in surrounding relation to a central aperture. Furthermore, another annular area, termed a lead-out area, is formed around the outer periphery of the main recording area. Reproduction of the program data from such compact disk (CD) is performed by means of a CD player, which is also standardized so as to be compatible with the standardized compact disk.

After manufacture of such compact disk as a complete product, no further or other data is recordable on the disk and, therefore, it is used merely for reproduction of the data already recorded thereon. In contrast with such read-only type of compact disk, a writable-type disk has been proposed which permits new data to be additionally recorded and then reproduced by the use of a laser light beam after manufacture as a complete or already recorded optical disk.

There is also known a post-writable record disk which permits data to be recorded thereon only once after completion as a final product. In such post-writable record disk, a guide groove for defining a record track is provided in a recording area where program data together with respective address data are to be recorded, and such recording area includes a main recording area, a lead-in area radially inside the main recording area and surrounding a central aperture, and a lead-out area formed around the outer periphery of the main recording area.

Recording of data on a post-writable record disk is effected by a light beam which is modulated in accordance with the data to be recorded and is projected to be incident upon positions which are predetermined in the recording area by a guide groove there provided. The resulting data-recorded region in the recording area has a light reflectance or reflection factor different from that of any other region of the disk. After such recording on a post-writable record disk, the light reflectance in its recording area is generally lower than that in a pre-recorded compact disk, so that the amount of read light reflected from the post-writable record disk is usually insufficient for reproduction by an ordinary CD player. For example, in the conventional optically post-writable record disk, the reflectance or reflection factor at the recorded area generally ranges from 15 to 45 per cent, whereas the prerecorded compact disk has a reflection factor exceeding 70 percent for ensuring reliable reproduction by a conventional CD player.

Although post-writable record disks of a high reflectance type have been recently proposed in which, after recording of data in the recording area, the latter has an adequately high light reflectance to ensure a sufficient amount of read light for a conventional CD player, such post-writable record disks are otherwise unsuitable for reproducing or playback in conventional CD players. More specifically, in reproducing program data from a prerecorded compact disk by a CD player, one of the important advantages has been the relatively quick access that is had to the plurality of sectional program data recorded on the compact disk. In achieving such ready access to the recorded plurality of program data, reference is made to the TOC data also recorded on the compact disk. Therefore, even if a post-writable record disk of high reflectance type retains a sufficiently high light reflectance for providing an ample amount of read light to a CD player from the region in which a plurality of sectional program data are recorded, it is still necessary, for the purpose of enabling ready access to the recorded sectional program data by the conventional CD player, that TOC data identifying such plural program data be recorded in a lead-in area, that is, similarly to the case of a prerecorded compact disk.

In an attempt to satisfy the foregoing, a technique has been proposed, for example, as disclosed in Japanese Laid Open Patent No. 61 (1986)-224186, for recording TOC data in the lead-in area of a writable record disk. However, such proposed technique for recording TOC data in the lead-in area of a writable record disk fails to maintain strict positional control with regard to the end portion of the lead-in area where the TOC data are recorded and also with regard to the data-recording start position in the main recording area extending around the lead-in area. As a result, a blank or non-recorded space is formed between the TOC-data recorded region of the lead-in area and the program-data recorded region of the main recording area, and such blank space may act as an impediment to proper reproduction of the data by a CD player.

OBJECTS AND SUMMARY OF THE INVENTION

Accordingly, it is an object of the present invention to provide an optically writable record for digital information which avoids the above-described problems associated with the prior art.

More specifically, it is an object of this invention to provide an optically writable record for digital information which can be readily reproduced by conventional CD players.

Another object of this invention is to provide an optically writable record disk on which a plurality of sectional program data are recorded along with respective absolute address data in a first annular recording area, and TOC data identifying the sectional program data are recorded in a second annular recording area in such a manner as to avoid any blank space between the recording areas containing the recorded TOC data and the program data, respectively.

Still another object of this invention is to provide an optically writable record disk, as aforesaid, and in which a plurality of sectional program data and respective TOC data are recorded on such disk in a manner to permit selective reproducing of the sectional program data by a conventional CD player, with ready access being had to any of the plurality of sectional program data by reference to the respective TOC data.

According to one aspect of the present invention, a digital information record comprises an optically writable record disk having a reflection factor substantially higher than seventy percent, first digital information including a plurality of program data and respective address data indicative of the individual addresses of the respective program data and being recorded with the latter sequentially along a first track in a first area of the record disk, and second digital information including table-of-contents data identifying the plurality of program data, respectively, and being recorded sequentially along a second track which is in a second area of the record disk and which has a concluding end contiguous to a starting end of the first track so that, upon playback of the digital information record, as in a conventional CD player, the table-of-contents data and the plurality of program data and respective address data ca be reproduced successively without interruption.

In a preferred embodiment of the digital information record, as aforesaid, the first and second areas are annular areas concentric with the record disk, with the second area being arranged radially inside of the first area.

According to another aspect of the invention, an apparatus for optically recording digital information on a record disk comprises a source of first digital information including a plurality of program data and address data indicative of individual addresses of the program data, respectively; memory means for storing second digital information including table-of-contents data identifying the plurality of program data, respectively; laser recording means for scanning first and second recording areas on the record disk; means for supplying the first digital information to the laser recording means during scanning of the first recording area for recording of the first digital information therein; means for reading the second digital information from the memory means and supplying the same to the laser recording means for recording by the latter in the second recording area during scanning of the latter by the laser recording means; means operative during the scanning of the second recording area for detecting a beginning portion of the first recording area and generating a code signal indicative of such beginning portion; and controlling means for halting the reading from the memory means in response to the code signal so that recording of the second digital information is controlled to avoid a non-recorded region between an end portion of the second recording area and the beginning portion of the first recording area.

In a preferred embodiment of the aforesaid apparatus for optically recording digital information on a record disk, the means for detecting the beginning portion of the first recording area includes laser reproducing means for scanning the recording areas on the record disk in advance of the laser recording means, and means responsive to the address data in the first digital information reproduced by the laser reproducing means when scanning the beginning portion of the first recording area for generating the code signal.

The above, and other objects, features and advantages of this invention, will be apparent in the following detailed description of a preferred embodiment which is to be read in connection with the accompanying drawing forming a part hereof and wherein the same or corresponding parts are identified by the same reference numerals in the several views.

DESCRIPTION OF A PREFERRED EMBODIMENT

Figure 1:
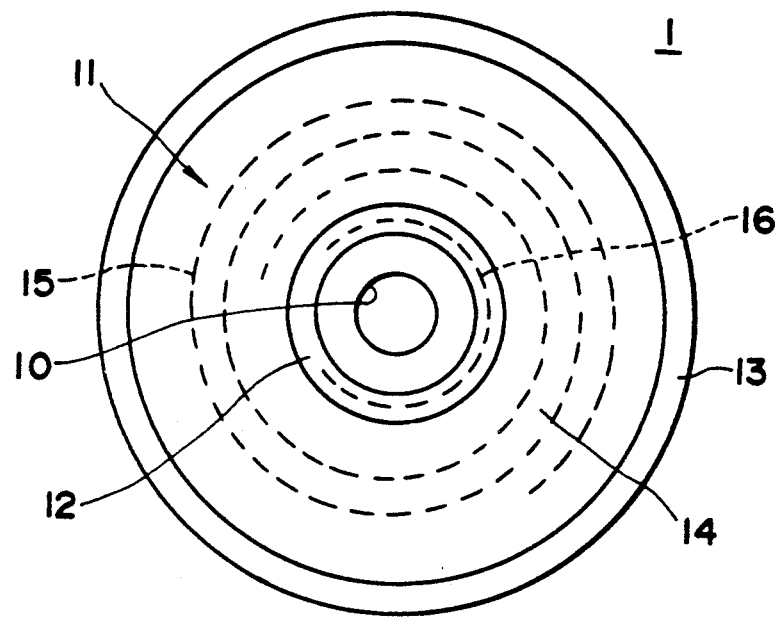
FIG. 1 is a plan view of an optically writable record digital information in accordance with an embodiment of the present invention.

Referring initially to FIG. 1, it will be seen that an optically writable record disk 1 according to an embodiment of the present invention has a central aperture 10 and a recording area 11 formed around such central aperture. An annular lead-in area 12 extends concentrically around the central aperture 10 and is constituted by an inner peripheral portion of the recording area 11, and an annular lead-out area 13 is also concentric with the central aperture 10 and is constituted by an outer peripheral portion of the recording area 11. The annular space or region of the recording area 11 situated radially between the lead-in area 12 and the lead-out area 13 constitutes a main or first annular recording area 14. A spiral groove extending around the central aperture 10 is suitably formed in the lead-in and lead-out areas 12 and 13 and the intervening main annular recording area 14 for conventionally determining the position of a record track.

A plurality of sectional program data are sequentially recorded in the main annular recording area 14 along a spiral record track 15 extending from the lead-in area 12 toward the lead-out area 13. Recorded with the sectional program data along the spiral record track 15 are respective absolute address data which are changed sequentially starting from reference address data which indicates the starting point for the recording of the plural sectional program data at the radially inner end of the spiral track 15, that is, at the inner periphery of the main annular recording area 14. The reference address data is recorded as an address zero which, for example, may be expressed as 00 minute, 00 second, 00 frame, as when the frame is a data unit included in the sectional program data and corresponds to a period of 1/75 second. Therefore, each of the individual absolute address data corresponds to the reproduction time of the respective sectional program data in the normal reproduction mode, as measured from the starting point of the recording of the plural sectional program data in the main recording area 14.

TOC data identifying the plural sectional program data, respectively, recorded in the main annular recording area 14 are recorded in the lead-in area 12 along a spiral track 16 which extends from the inner periphery of the lead-in area 12. In accordance with this invention, the outer end of the spiral record track 16 in the lead-in area 12 is contiguous or connected to the inner end of the spiral record track 15 in the main annular recording area 14, and the recorded TOC data appear, without interruption, along the spiral track 16 up to the position, at the beginning of the spiral track 15, in the main annular recording area 14, where the reference address data is recorded for indicating the start point of the recorded plural sectional program data. In the case where the distance along the spiral track 16 in the lead-in area 12 is greater than the distance required for the recording of a complete series of the TOC data identifying all of the plural sectional program data recorded in the main annular recording area 14, such series of TOC data is recorded repeatedly a number of times, in whole or in part along the spiral track 16 so as avoid any interruption between the TOC data recorded along the spiral track 16 and the starting point of the plural sectional program data recorded along the spiral track 15 in the main annular recording area 14.

Figure 2:
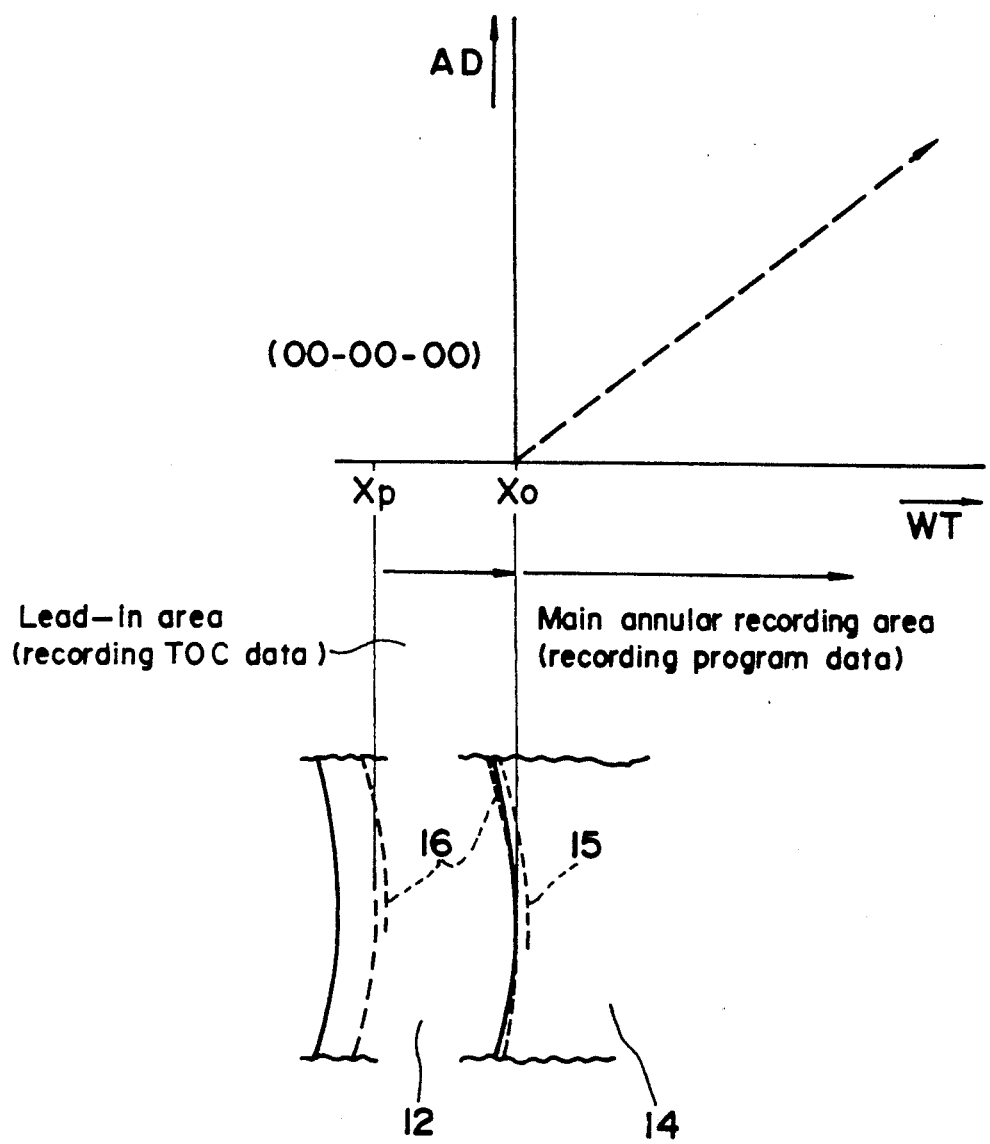
FIG. 2 graphically illustrates the relationship between address data and recording areas in which TOC data and program data along with the respective address data are respectively recorded in the writable record disk illustrated in FIG. 1.

Referring now to FIG. 2 which shows the relationship between the scanning time WT for scanning in the radially outward direction in a normal reproduction mode and the value AD of the absolute address data, it will be seen that scanning of the track 16 is started at the time Xp and, thereafter, the absolute address data appears with its value AD of 00 minute 00 second 00 frame at the time Xo when scanning is shifted from the track 16 to the track 15 along which the sectional program data are recorded with the absolute address data. Subsequent to the time Xo, as the scanning of the track 16 progresses, the value AD of the absolute address data recorded along such track 16 increases progressively from the zero value, that is, from 00 minute 00 second 00 frame.

It is to be noted that the procedure employed for recording sectional program data, such as data representing a plurality of musical selections and corresponding TOC data on a writable record disk, is necessarily different from the known procedure used, for example, in producing a conventional mother compact disk, and in which the TOC data and the sectional program data already recorded on a source tape are directly dubbed. In other words, all of the sectional program data and all of the respective TOC data are already available when a conventional mother compact disk is produced. As distinguished from the foregoing, when a plurality of musical selections are to be recorded in succession along the spiral track 15 in the main annular recording 14 of the writable record disk, the second and subsequent musical selections to be recorded may not have been even identified at the time when the first musical selection is being recorded so that the information needed for developing all of the TOC data identifying the several recorded musical selections is not available prior to the commencement of the recording of the first musical selection. Therefore, it is not possible to first record the TOC data in the lead-in area 12 and, after all of the TOC data has been thus recorded, then record the plural program data representing the several musical selections without any interruption between the end of the recorded TOC data and the commencement of the program data. In the procedure actually used for recording plurality of musical selections on a writable record disk, the program data representing the first musical selection is initially recorded in the innermost portion of the main annular recording area 14 and, thereafter, the TOC data corresponding to, or identifying the first musical selection is recorded in the lead-in area 12. Subsequently, the data corresponding to the second musical selection may be recorded in the area 14 in succeeding relation to the data corresponding to the first musical selection, and the TOC data identifying the second musical selection is recorded in the lead-in area 12 following the previously recorded TOC data.

As earlier noted, in accordance with the present invention, the concluding end portion of the TOC data recorded in the outer periphery of the lead-in area 12 is made contiguous to the beginning of the sectional program data recorded at the inner periphery of the main annular recording area 14 so as to avoid any non-recorded region between the recorded TOC data in the lead-in area 12 and the recorded sectional program data in the main recording area 14, and thereby to provide the recorded writable record disk with the same format as the conventional compact disk.

Generally, in accordance with the present invention, and as hereinafter described in detail, the TOC data identifying the plurality of musical or other program data successively recorded in the main recording area 14 are stored in a memory during such recording of the program data and, after all of the program data has been recorded, the TOC data are read from the memory and recorded without interruption in the lead-in area 12 up to the beginning of the recording of the program data in the recording area 14.

By reason of the avoidance of any gap or non-recorded region between the TOC data recorded in the lead-in area 12 and the program data recorded in the main annular recording area 14, a writable record disk recorded in accordance with the present invention, and which thereby has a format equal to that of the conventional compact disk, may be reproduced or played back by a conventional CD player.

Figure 3:
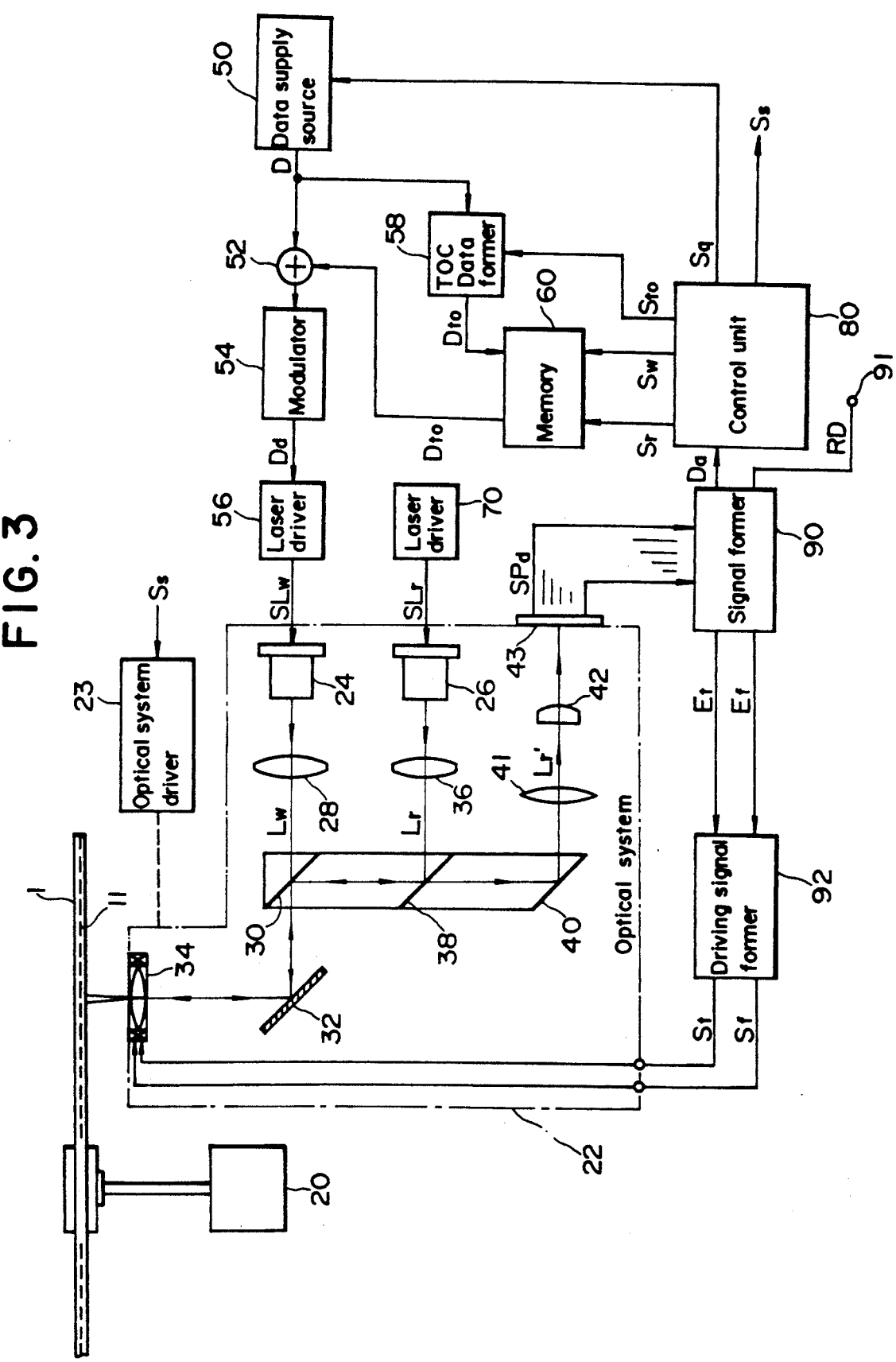
FIG. 3 is a block diagram showing a disk recording apparatus according to an embodiment of this invention.

Referring now to FIG. 3, it will be seen that an apparatus according to an embodiment of the present invention for recording a plurality of sectional program data and respective TOC data on a writable record disk 1 as described above has a motor 20 or the like for rotating the writable record disk 1 at a predetermined speed. An optical system or unit 22 is disposed opposite the recording area 11 of the rotatably mounted record disk 1 and is movable radially in respect to the latter by means of an optical system driver 23.

Laser elements 24 and 26 are incorporated in the optical unit 22 and suitably driven, as hereinafter described, so that the laser element 24 generates a recording laser light beam Lw of relatively great power, while the laser element 26 generates a reproducing laser light beam Lr of relatively small power. The recording laser light beam Lw passes from the laser element 24 through a collimator lens 28 to become a parallel beam which then passes through a beam splitter 30 and is reflected by a mirror 32 for passage through an objective lens 34 by which the beam Lw is focused to be incident upon the recording are 11 of the writable record disk 1. The reproducing laser light beam Lr from the laser element 26 is similarly passed through a collimator lens 36 to become a parallel beam which is reflected by a beam splitter 38 prior to being reflected by the previously mentioned beam splitter 30 and then by the mirror 32 so as to enter the objective lens 34 and be focused by the latter upon the recording area 11 of the writable record disk 1. Thus, the recording laser light beam Lw and the reproducing laser light beam Lr are made to be incident upon the recording area 11 of the writable record disk 1 through the common objective lens 34 which is movably mounted relative to a frame of the optical unit 22 in a conventional manner for effecting both tracking and focusing adjustments of the laser light beams Lw and Lr.

Figure 4:
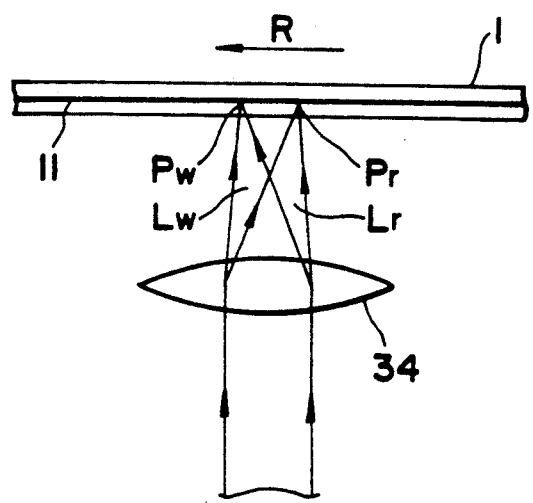
FIG. 4 illustrates the operation of an optical system employed in the apparatus of FIG. 3.

As is shown particularly on FIG. 4, the recording laser light beam Lw and the reproducing laser light beam Lr are focused by the objective lens 34 so as to be incident upon the recording area 11 of the writable record disk 1 at positions Pw and Pr, respectively, which are spaced from each other by an extremely small distance in a direction along the spiral record track 15 or 16. Furthermore, with the direction of rotation of the writable record disk 1 being indicated by the arrow R of FIG. 4, it will be seen that the position Pr at which the reproducing laser light beam Lr s incident on the recording area 11 is ahead, or in front of, the position Pw at which the recording laser light Lw is incident on the recording area 11. By reason of the foregoing, as the record disk 1 turns in the direction of the arrow R, the reproducing laser light beam Lr will reproduce o read data recorded at the point or position of impingement Pr before the recording laser light beam Lw impinges against that point or position on the recording layer 11 of the writable record disk 1.

The reproducing laser light beam Lr incident upon the recording area 11 of the writable record disk 1 at the position Pr is reflected therefrom, and, when the beam Lr scans a record track, the resulting reflected laser light beam Lr' is modulated by the data recorded in such track prior to being returned to the objective lens 34. The reflected laser light beam Lr' is directed by the objective lens 34 so as to be reflected by the mirror 32 and then by the beam splitter 30, whereupon the reflected laser light beam Lr' passes through the beam splitter 38 and is reflected by a mirror 40 so as to be introduced through a condenser lens 41 and a cylindrical lens 42 to a light detector 43.

The apparatus for optically recording digital information on a writable record disk in accordance with an embodiment of this invention is further shown on FIG. 3 to comprise a data supply source 50 for supplying record data D composed of a plurality of sectional program data, for example, corresponding to respective musical selections, to be recorded on the writable record disk 1 and absolute address data accompanying such program data. The record data D from the source 50 are passed through an adder 52 to a modulator 54 for providing a corresponding modulated signal Dd which is to be recorded, and which is supplied to a laser driver 56 for the laser element 24. Thus, a laser driving signal SLw corresponding t the modulated signal Dd is supplied from the driver 56 to the laser element 24 with the result that the recording laser light beam Lw emitted by the element 24 is intensity-modulated in accordance with the signal Dd to be recorded.

The record data D from the source 50 are also supplied to a TOC data former or generating circuit 58 which, in response to the address data included in the record data D, generates TOC data Dto identifying the respective plurality of sectional program data supplied in sequence. Such TOC data Dto from the data former 58 are stored or written sequentially in a memory 60 which may be a RAM. When the supplying of the record data D from the source 50 has been completed, the TOC data Dto stored in the memory 60 are sequentially read therefrom and supplied through the adder 52 to the modulator 54. The modulated signal Dd from the modulator 54 which then represents the sequential TOC data is also supplied to the laser driver 56, whereby, the laser driving signal SLw from the laser driver 56 corresponds to the TOC data and similarly intensity-modulates the recording laser light beam Lw emitted from the laser element 24.

The data supply source 50 and the TOC data former 58 are controlled by control signals Sq and Sto, respectively, supplied thereto from a control unit or controller 80 which may be constituted by a suitable microprocessor, and which further provides write and read signals Sw and Sr for controlling the memory 60 and an optical unit control signal Ss which is supplied to the optical system driver 23 for controlling the movements of the optical unit 22 radially in respect to the rotatably mounted writable record disk 1.

Detection outputs SPd obtained by detecting the reflected laser light beam Lr by means of a plurality of light sensitive elements included in the light detector 43 are supplied from the latter to a signal forming circuit 90. The signal forming circuit 90 conventionally may provide a tracking error signal Et, a focus error signal Ef, reproduced program data RD and reproduced address data Da in response to the detection outputs SPd. The tracking error signal Et and the focus error signal Ef are supplied to a driving signal forming circuit 92 which, in response thereto, provides a tracking control signal St and a focus control signal Sf to a tracking control driver and a focus control driver (not shown) which are conventionally associated with the objective lens 34 in the optical unit 22 for effecting both tracking servo control and focus servo control. Further, as shown on FIG. 3, the reproduced address data Da are supplied from the signal forming circuit 90 to the controller 80, and the reproduced program data RD are supplied from the signal forming circuit 90 to an output terminal 91.

Figure 5:
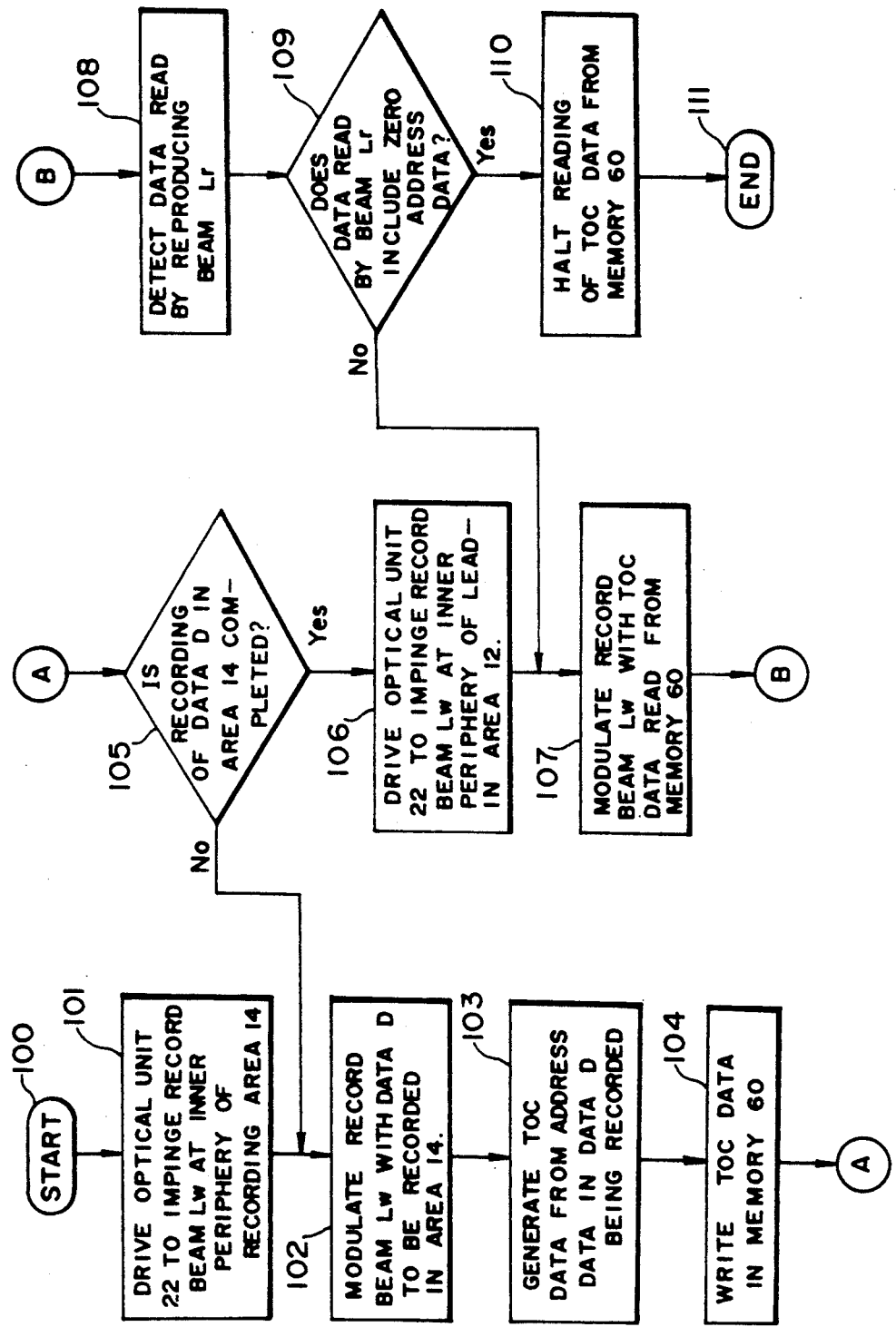
FIG. 5 is a flow chart to which reference will be made in explaining the operation of the recording apparatus of FIG. 3.

A recording operation of the apparatus embodying the present invention will now be further described with reference to FIG. 5 which illustrates a suitable programming of the controller 80 for that purpose. More particularly, at the start 100 of the recording program, the controller provides an optical unit driving signal Ss to the optical unit driver 23 which, in the step 101, causes the optical unit 22 to be moved radially relative to the writable record disk 1 for causing the recording laser light beam Lw to impinge on the recording area 11 at the inner periphery of the main annular recording area 14. Then, in the step 102, the record data D which includes plural sectional program data and absolute address data representative of content which increases sequentially from the zero address data, are transmitted from the source 50 in response to the control signal Sq from the controller 80. Further, the control signal Ss from the controller 80 causes the optical unit driver 23 to effect slow radially outward movement of the optical unit 22 so that, as the record disk 1 is rotated, the point of impingement of the recording laser light beam Lw on the recording area 11 is made to trace the spiral record track 15 in the main annular recording area 14. During such scanning of the spiral track 15 by the recording laser light beam Lw, such light beam is intensity-modulated in accordance with the modulated record data Dd with the result that the plural sectional program data along with the respective absolute address data are sequentially recorded along the track 15 in the main annular recording area 14 of the writable record disk 1. It will be appreciated that the absolute address data recorded, as aforesaid, with the respective plural sectional program data represent a content which is increased sequentially from the zero address data positioned at the inner end of the spiral track 15 where the recording of the plural sectional program data begins.

Simultaneously with such recording of the modulated data Dd along the spiral track 15 in the main recording area 14, in the step 103, the controller 80 provides the control signal Sto to the TOC data forming circuit 58 so that the forming circuit 58 generates TOC data Dto identifying the plural sectional program data, respectively, included in the record data D obtained from the source 50. In the next step 104, the TOC data Dto thus obtained are sequentially written in the memory 60 in response to write signals Sw from the controller 80.

The program then proceeds to the step 105 in which it is determined whether the recording of data in the main recording area 14 on the disk 1 has been completed. Such determination may be effected by the controller 80, for example, in response to the suitably sensed radial position of the optical unit 22 indicating that the recording capacity of the main recording area 14 has been exhausted. In any event, if the recording of data in the area 14 has not been completed, that is if a NO answer is obtained in the step 105, the program returns to the step 102. On the other hand, when the recording of data in the area 14 has been completed, that is, when a YES answer is obtained in step 105, the program proceeds to a step 106 in which the control signal Ss from the controller 80 causes the driver 23 to radially move the optical unit 22 to a position in which the recording laser light beam Lw is incident on the recording area 11 of the disk 1 at a position on the inner periphery of the lead-in area 12. Then, in the step 107, the controller 80 provides a read signal Sr to the memory 60 so that the TOC data Dto previously written in the memory is read therefrom and supplied through the adder 52 to the modulator 54. Thus, the recording laser light beam Lw is then intensity modulated in accordance with the TOC data Dto while the control signal Ss then applied to the driver 23 causes slow radially outward movement of the optical unit 22. As a result of the foregoing, the recording laser light beam Lw, while being intensity modulated with the TOC data Dto, scans the spiral track 16 in the lead-in area 12 and thereby records the TOC data Dto along such spiral track 16 on the writable record disk 1.

Simultaneously with the recording of the TOC data Dto along the spiral track 16, the laser driver 70 is made operative so that the reproducing laser light beam Lr is projected to be incident upon the lead-in area 12 of the writable record disk 1 at the position Pr slightly ahead of the position Pw at which the recording laser light beam Lw is then recording the TOC data. As the reproducing laser light beam Lr scans the track 16 slightly ahead of the recording laser light beam Lw, any data or signal thus reproduced is detected by the light detector 43 and the signal forming circuit 90, as in step 108.

In the following step 109, the controller 80 determines whether or not any data being read by the reproducing laser light beam Lr includes the zero address data; the zero address data acts as a code signal indicative of the beginning of the program data. If a NO answer is obtained at step 109, that is, if the TOC data being recorded along the spiral track 16 has not yet completely filled the space available along such track 16 up to the beginning of the recording of the plural program data in the spiral track 15 on recording area 14, the routine returns to step 107. In other words, the series of TOC data stored in the memory 60 is read in whole, and then repeatedly at least in part, as required, for recording along the spiral track 16 until such track 16 is fully occupied bym the TOC data. On the other hand, when a YES answer is obtained at step 109, that is, at the instant when the reproducing laser light beam Lr impinges on the beginning of the spiral track 15 at which the zero address data is recorded, the reproducing of the zero address data is detected and, in response thereto, the controller 80 causes the signal Sr to halt the reading of the stored TOC data from the memory 60, as in the step 110, whereupon the recording operation is ended, as in the concluding step 111.

As a result of the foregoing recording operation, the TOC data Dto are recorded all along the spiral track 16 extending from the inner periphery of the lead-in area 12 relatively close to the central aperture 10 up to the point at which the plural sectional program data begin to be recorded in the spiral track 15 which extends from the inner peripheral margin of the main annular recording area 14 out to the lead out area 13. During the described recording operation, a tracking error signal Et and a focus error signal Ef are obtained from the signal forming circuit 90 in accordance with the detection output SPd of the light detector 43 corresponding to the modulated reflected reproducing laser light beam Lr', and tracking servo control and focus servo control are respectively executed on the basis of such error signals.

It is to be noted that the apparatus described above for recording an optically writable record may also be employed for reproducing the data previously recorded in the track 15. In such case, the reproducing laser light beam Lr is made operative and scans the track 15 on the rotated record disk 1, whereupon the reproduced program data RD from the signal forming circuit 90 is derived at the output terminal 91.

It will be appreciated that, in an optically writable record according to this invention, a plurality of program data and respective absolute address data are recorded sequentially along a first track 15 in a first annular recording area 14 on a post-writable record disk, and TOC data identifying the plurality of program data are recorded sequentially along a second track 16 which is in a second annular recording area 12 of the record disk, preferably within the first annular recording area, with the second track 16 having a concluding end contiguous to a starting end of the first track 15, that is, without any non-recorded or blank region therebetween. By reason of the foregoing, the writable record disk recorded in accordance with the present invention can be reproduced by a conventional compact disk player with ready access to the plural recorded sectional program data.

Having described a specific embodiment of the present invention with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. A digital information record comprising: an optically writable record disk having a reflection factor substantially higher than seventy percent, first digital information including a plurality of program data and respective address data indicative of the individual addresses of the respective program data and being recorded with the latter sequentially along a first track in a first area of said record disk, second digital information including table-of-contents data identifying said plurality of program data, respectively, and being recorded sequentially along a second track which is in a second area of said record disk, said second area being contiguous with said first area and having a recording capacity greater than that required for said second digital information, and said second digital information being recorded at least in part more than once along said second track so as to fully occupy said second area and thereby cause said second track to have a concluding end contiguous to a starting end of said first track so that, upon playback of the digital information record, said table-of-contents data and said plurality of program data and respective address data can be reproduced successively without interruption.

2. A digital information record according to claim 1; in which said first and second areas are annular areas concentric with said record disk, with said second area being arranged radially inside of said first area.

3. A digital information record according to claim 2; in which said first and second tracks are spirals, and said plurality of program data and respective address data and said table-of-contents data are arranged sequentially along said first and second spiral tracks, respectively, in the direction from the radially inner end to the radially outer end of the respective spiral track.

4. A digital information record according to claim 3; in which said record disk includes a recording layer which has said reflection factor substantially higher than seventy percent.

5. A digital information record according to claim 3; in which said plurality of program data are audio data.

6. A digital information record according to claim 5; in which said first and second digital information are recorded in accordance with a standard for compact disks so that the optically writable record disk can be reproduced by a conventional compact disk player.

7. An apparatus for optically recording digital information on a record disk, comprising:

a source of first digital information including a plurality of program data and address data indicative of individual addresses of said program data, respectively;

memory means for storing second digital information including table-of-contents data identifying said plurality of program data, respectively;

laser means for scanning first and second recording areas on the record disk with said second recording area being contiguous with said first recording area and having a recording capacity greater than that required for said second digital information;

means for supplying said first digital information to said laser recording means during scanning of said first recording area for recording of said first digital information therein;

means for repeatedly reading said second digital information from said memory means and supplying the same to said laser recording means for recording by the latter in said second recording area during scanning of the latter by said laser recording means;

means operative during said scanning of the second recording area for detecting a beginning portion of said first recording area and generating a code signal indicative of said beginning portion; and controlling means for halting said reading from said memory means only upon the occurrence of said code signal so that recording of said second digital information is controlled to avoid a non-recorded region between an end portion of said second recording area and said beginning portion of said first recording area.

8. An apparatus according to claim 7; in which said plurality of program data are audio signals.

9. An apparatus for optically recording digital information on a record disk, comprising:

a source of first digital information including a plurality of program data and address data indicative of individual addresses of said program data, respectively;

memory means for storing second digital information including table-of-contents data identifying said plurality of program data, respectively;

laser means for scanning first and second recording areas on the record disk;

means for supplying said first digital information to said laser recording means during scanning of said first recording area for recording of said first digital information therein;

means for reading said second digital information from said memory means and supplying the same to said laser recording means for recording by the latter in said second recording area during scanning of the latter by said laser recording means;

means operative during said scanning of the second recording area for detecting a beginning portion of said first recording area including laser reproducing means for scanning said recording areas on the record disk in advance of said laser recording means, and means responsive to said address data in said first digital information reproduced by said laser reproducing means when scanning said beginning portion of said first recording area for generating a code signal indicative of said beginning portion; and controlling means for halting said reading from said memory means in response to said code signal so that recording of said second digital information is controlled to avoid a non-recorded region between an end portion of said second recording area and said beginning portion of said first recording area.

10. An apparatus for optically recording digital information on a record disk, comprising:

a source of first digital information including a plurality of program data and address data indicative of individual addresses of said program data, respectively;

means for generating table-of-contents data in response to said address data for identifying said plurality of program data, respectively;

means for rotatably mounting the record disk;

an optical unit movable radially in respect to the rotatably mounted record disk and including laser recording means for scanning first and second spiral tracks in first and second annular recording areas which are contiguously arranged on the record disk as the record disk is rotated and said optical unit is moved radially to cause said laser recording means to radially traverse said first and second annular recording areas, respectively;

means for supplying said first digital information to said laser recording means during the scanning of said first spiral track for the recording of said plurality of program data and respective address data sequentially along said first spiral track in said first recording area;

memory means for storing said table-of-contents data during said recording of the respective program data and address data in said first recording area;

means for repeatedly reading said table-of-contents data from said memory means and supplying the same to said laser recording means for recording by the latter along said second spiral track in said second recording area as said laser recording means radially traverses said second recording area with said second recording area having a recording capacity greater than that required for said table-of-contents data;

means operative during the traversing of said second recording area for detecting a beginning portion of said first recording area; and controller means programmed to halt said reading from said memory means only upon said detecting of the beginning portion so that recording of said table-of-contents data is controlled to avoid a non-recorded region between an end of said second spiral track and the beginning of said first spiral track.

11. An apparatus for optically recording digital information on a record disk, comprising:
- a source of first digital information including a plurality of program data and address data indicative of individual addresses of said program data, respectively;
- means for generating table-of-contents data in response to said address data for identifying said plurality of program data, respectively;
- means for rotatably mounting the record data;
- an optical unit movable radially in respect to the rotatably mounted record disk and including laser recording means for scanning first and second spiral tracks in first and second annular recording areas on the record disk as the latter is rotated and said optical unit is moved radially to cause said laser recording means to radially traverse said first and second annular recording areas, respectively;
- means for supplying said first digital information to said laser recording means during the scanning of said first spiral track for the recording of said plurality of program data and respective address data sequentially along said first spiral track in said first recording area;
- memory means for storing said table-of-contents data during said recording of the respective program data and address data in said first recording area;
- means for reading said table-of-contents data from said memory means and supplying the same to said laser recording means for recording by the latter along said second spiral track in said second recording area as said laser recording means radially traverses said second recording area;
- means operative during the traversing of said second recording area for detecting the beginning portion of said first recording area including laser reproducing means for scanning said recording areas on the record disk in advance of said laser recording means; and
- controller means programmed to halt said reading from said memory means in response to selected address data in said first digital information reproduced by said laser reproducing means when scanning said beginning portion of said first recording area so that recording of said table-of-contents data is controlled to avoid a non-recorded region between an end of said second spiral track and the beginning of said first spiral track.

12. An apparatus according to claim 11; in which said second recording area is arranged radially inside of said first recording area; and said controller means is further programmed to cause radially outward movement of said optical unit during the traversing of said first annular recording area by said laser recording means for recording said plurality of program data and respective address data along said first spiral track, to then radially inwardly return said optical unit, and to again cause radially outward movement of said optical unit during the traversing of said second annular recording area by said laser recording means for recording said table-of-contents data along said second spiral track.

13. An apparatus according to claim 12; further comprising tracking and focusing servo means responsive to outputs of said laser reproducing means during said recording of the plurality of program data and respective address data along said first spiral track and during the recording of said table-of-contents data along said second spiral track.

* * * * *